United States Patent [19]
Richardson

[11] Patent Number: 5,867,823
[45] Date of Patent: *Feb. 2, 1999

[54] RETAIL CENTER ANALYSIS AND INSTRUCTION SYSTEM

[75] Inventor: Owen Richardson, Pepperell, Mass.

[73] Assignee: The Butcher Company, Inc., Marlborough, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 529,223

[22] Filed: Sep. 15, 1995

[51] Int. Cl.⁶ ...................................... G06F 17/60
[52] U.S. Cl. ............................................. 705/9
[58] Field of Search ................... 395/201, 202, 395/208, 209, 211, 232; 364/468.01–468.06, 705.06, 709.04, 710.03, 710.04; 705/1, 2, 8, 9, 11, 32

[56] References Cited

U.S. PATENT DOCUMENTS

| 4,530,067 | 7/1985 | Dorr | 395/215 |
| 4,710,616 | 12/1987 | Utley | 235/472 |
| 4,839,061 | 6/1989 | Manchak, Jr. et al. | 210/743 |
| 5,006,983 | 4/1991 | Wayne et al. | 395/208 |
| 5,068,787 | 11/1991 | Pipella et al. | 395/232 |
| 5,093,786 | 3/1992 | Derks | 395/800 |
| 5,120,942 | 6/1992 | Holland et al. | 235/376 |
| 5,121,319 | 6/1992 | Fath et al. | 364/188 |
| 5,166,499 | 11/1992 | Holland et al. | 235/376 |
| 5,212,635 | 5/1993 | Ferriter | 395/211 |
| 5,267,147 | 11/1993 | Harshaw et al. | 395/232 |

Primary Examiner—Edward R. Cosimano
Assistant Examiner—Barton L. Bainbridge
Attorney, Agent, or Firm—Robert L. Goldberg; Peter F. Corless

[57] ABSTRACT

The present invention relates to a maintenance analysis and instruction system particularly useful for a retail center such as a grocery store. In preferred aspects, the invention provides systems and methods that comprise a portable-device that can instruct a retail center or other worker to attend to various incidents that may occur at a retail center or other location such as product spills, and systems and methods for maintaining an accurate and reliable record of sweeping, mopping and other tasks completed at the retail center. In another preferred aspect, the invention provides systems and methods for accurately tracking work completed at the retail center or other location such as sweeping, spill clean-up or inspection of various areas of the retail center or other location.

15 Claims, 9 Drawing Sheets

RETAIL CENTER ANALYSIS AND INSTRUCTION SYSTEM

BACKGROUND OF THE INVENTION

1. Field of the Invention

The present invention relates to a maintenance analysis and instruction system particularly useful for a retail center such as a grocery store. In preferred aspects, the invention provides systems and methods that comprise a portable device that can instruct a retail center or other worker to attend to various incidents that may occur at a retail center or other location such as product spills, and systems and methods for maintaining an accurate and reliable record of sweeping, mopping and other tasks completed at the retail center. In another preferred aspect, the invention provides systems and methods for accurately tracking work completed at the retail center or other location such as sweeping, spill clean-up or inspection of various areas of the retail center or other location.

2. Background

Retail centers such as grocery stores constantly experience breakage and spills of products. For example, in grocery stores glass containers may be knocked off shelves by shoppers and fall and break on the ground to send fluid and/or solid materials across an area of the store floor. Such an incident may be hazardous to persons within the store, e.g., a shopper may slip on the spilled material. This could result in injury to the shopper as well as potential liability for the store owner.

Current maintenance procedures in a retail center such as a grocery store typically include a more or less regular sweeping or mopping of floors during the store's operation. That practice is designed to help ensure the store floors remain free of spilled materials or other potential hazards.

Once an accident occurs within a grocery store or other retail center, however, it is often difficult if not practically impossible to verify that the store has been maintained in a safe manner, e.g. in the case of a slip and fall-type accident, that the store's floors have been regularly and uniformly cleaned to ensure that no debris remains on the floor surface for an extended period. For instance, often workers who clean the floors may have limited English language skills and therefore it will be difficult to keep accurate written records of a maintenance schedule. Additionally, store workers are often interrupted during the course of regular duties to attend to various tasks such as unloading delivery trucks, cleaning of a product spill and the like. Such constant interruptions again make keeping of accurate records of cleaning (e.g. sweeping) and inspection of floors and other maintenance work difficult if not impossible.

Additionally, retail center maintenance workers could be aided by some type of guidance relating to various tasks performed. For example, in the case of a spill pick up, it may be desirable to provide a worker safety tips or reminder of disposal procedures to ensure the worker carries out the cleaning job in a safe manner and according to desired procedures. However, it is typically difficult to convey such information on a regular basis, particularly for those workers with limited English language skills.

It thus would be desirable to have a system that could conveniently and accurately record maintenance of a retail center such as a grocery store, including where a worker may be interrupted during the work day from carrying out maintenance duties. It would be further desirable to have a system that could provide a maintenance worker guidance for conducting various task such as cleaning of a product spill, sweeping, mopping, etc.

SUMMARY OF THE INVENTION

The present invention provides a system that aids the maintenance of a retail center such as a grocery store. In particular, the system provides a worker guidance and instruction for carrying out a given task and can accurately record maintenance duties carried out by a worker without the need for written records. In another embodiment, the invention provides a system that tracks and records work completed at the retail center such as sweeping and/or mopping of floors or inspection of various areas of the retail center.

In one aspect, the maintenance system of the invention comprises use of a portable device that is capable of recording completion of maintenance duties and/or providing a worker guidance for conducting a particular maintenance task such as sweeping, mopping, cleaning of a product spill, etc. Maintenance records can be stored in the portable device by several methods. For example, a worker can input information into the device as a task is commenced or completed. Such input of information can include scanning of a bar code label with a scanner associated with the portable device as well as the worker more directly inputting information himself, such as in response to messages displayed on a display apparatus associated with the device.

Additionally, the portable device can provide the worker instructions and other guidance for carrying out a given task. For example, upon encountering a product spill in a grocery store, the worker can input into the device that a spill clean-up is to be commenced. The device can then instruct the worker on safety and disposal procedures and the like. Other information can be recorded into the device such as location of the spill, identity of the spilled product, etc. Further, the cleaning of floor surfaces can be recorded on the device to provide a record of regular maintenance. A retail center worker may suitably carry the portable device throughout the course of the work day and thereby record various tasks. In addition to retail centers, the systems and methods of the invention can be used in health-care facilities, hospitality centers and the like.

Other aspects of the invention are disclosed infra.

DETAILED DESCRIPTION OF THE INVENTION

Figure 1:
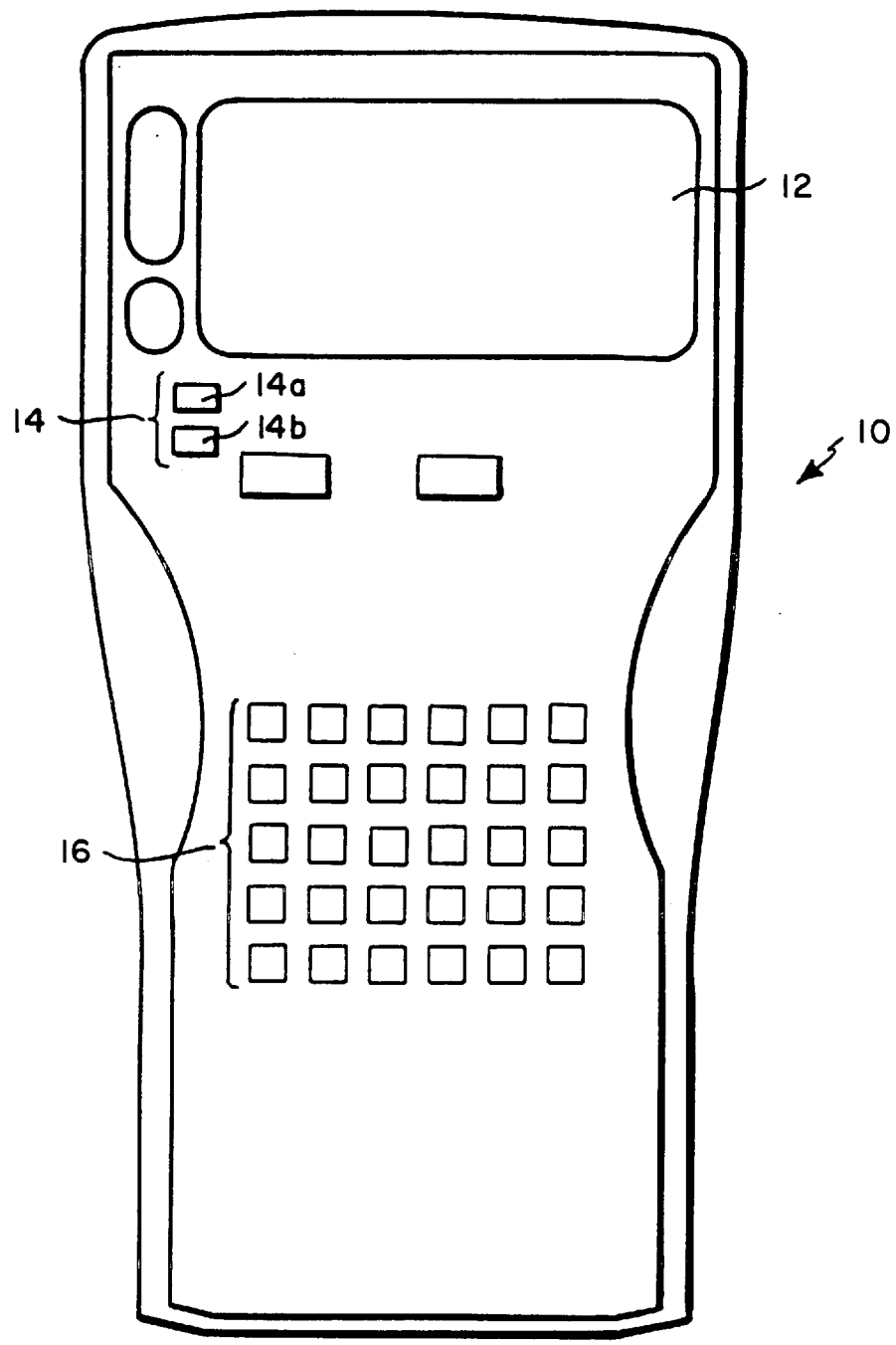
FIG. 1 is a top view of a portable device of the invention.

Referring now to the Drawings, where like reference numerals generally refer to like elements throughout the several Figures, FIG. 1 shows a preferred portable device 10 of the invention that includes a display 12 that can provide information to a user, one or more on/off switches 14 (specifically shown as 14a and 14b), and one or more input keys 16. In FIG. 1, keys 16 are generally shown to depict an alphanumeric display, although other types of input keys may be employed such as an icon key system as discussed below and exemplified in FIG.2. Device 10 also may include a bar code reader or other sensor for input of information.

Device 10 contains a computer to enable recording information and providing instructions to a user. Device 10 preferably is of a size so that it can be readily held in a single hand of a user and may be attached to a user's belt or carrying case or otherwise conveniently carried. Device 10 is suitably battery powered and capable of connection by standard cable or other means to a standard printer or a computer such as an IBM personal computer to enable transfer of information from device 10.

While a variety of commercially available devices with requisite modifications could be employed as a suitable portable device 10 in accordance with the present invention, a preferred device is available from Psion (United Kingdom) and is sold under the tradename of the Psion Workabout, and is modified as described herein to incorporate disclosed features. That Psion device includes a 16 bit processor and a 256 kb internal memory, a liquid crystal display and an alphanumeric key layout on the device top surface.

Figure 2:
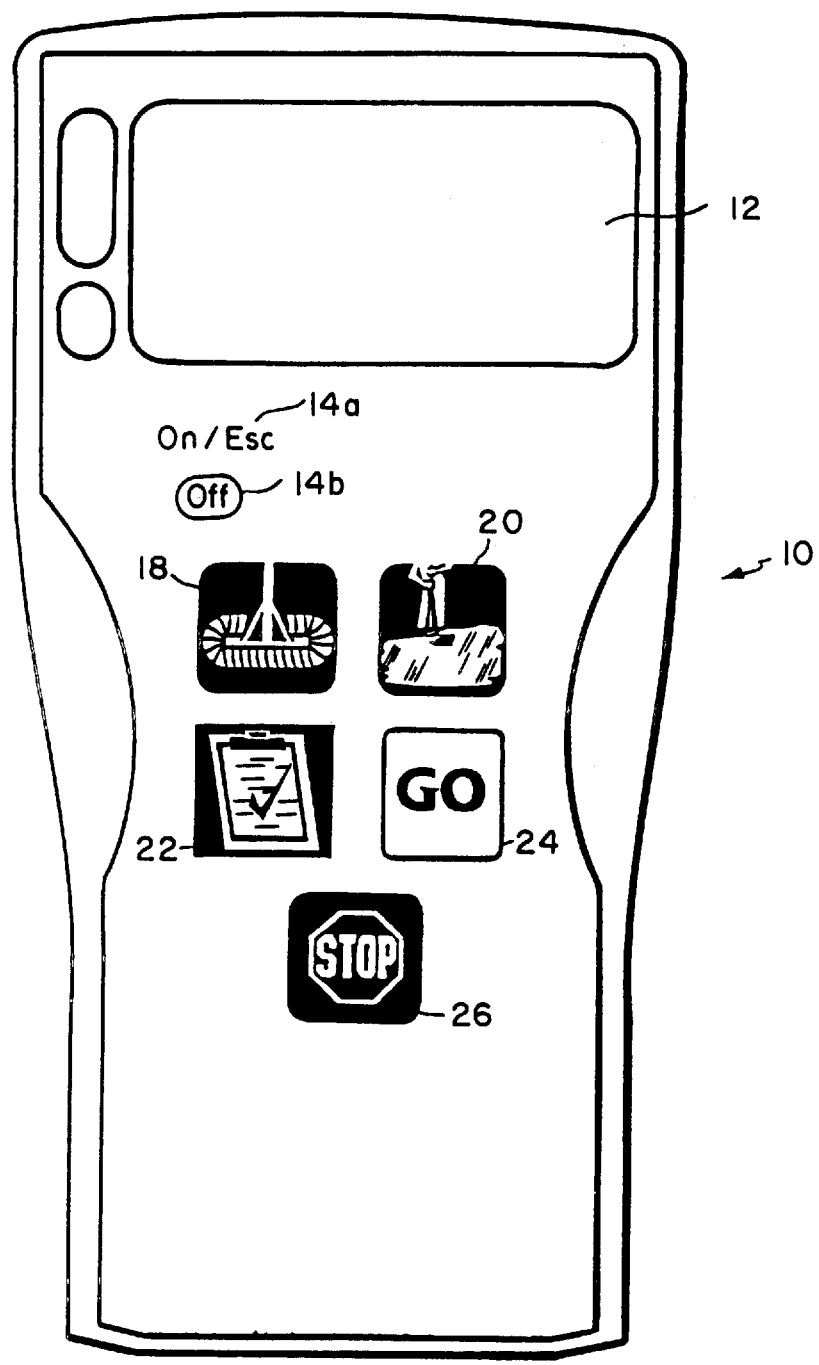
FIG. 2 is a top view of a further portable device of the invention.
Figure 3A:
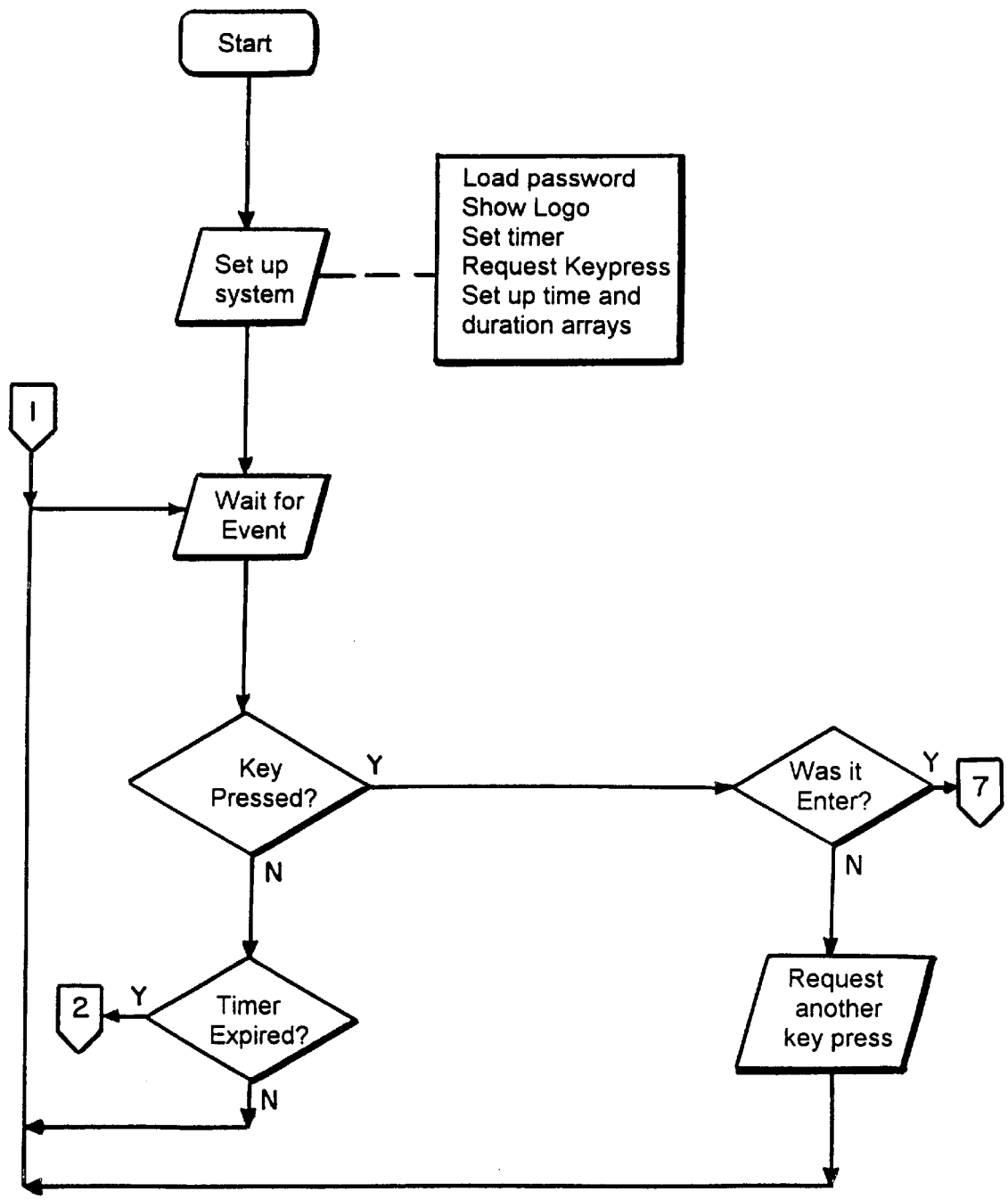
FIG. 3 (which includes FIGS. 3A–3G) shows a flow chart of a suitable program for use of the portable device of the invention.
Figure 3B:
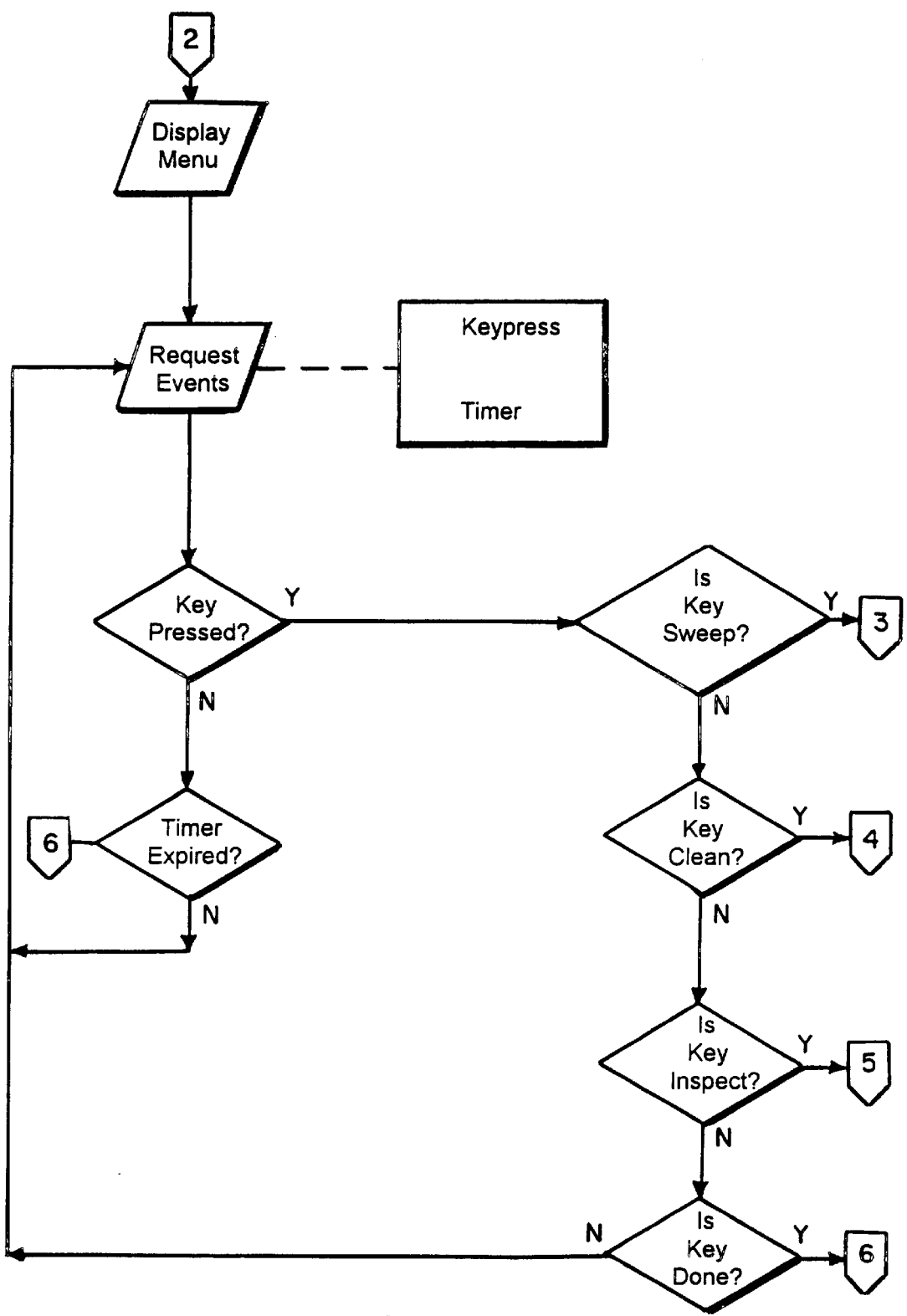
Figure 3C:
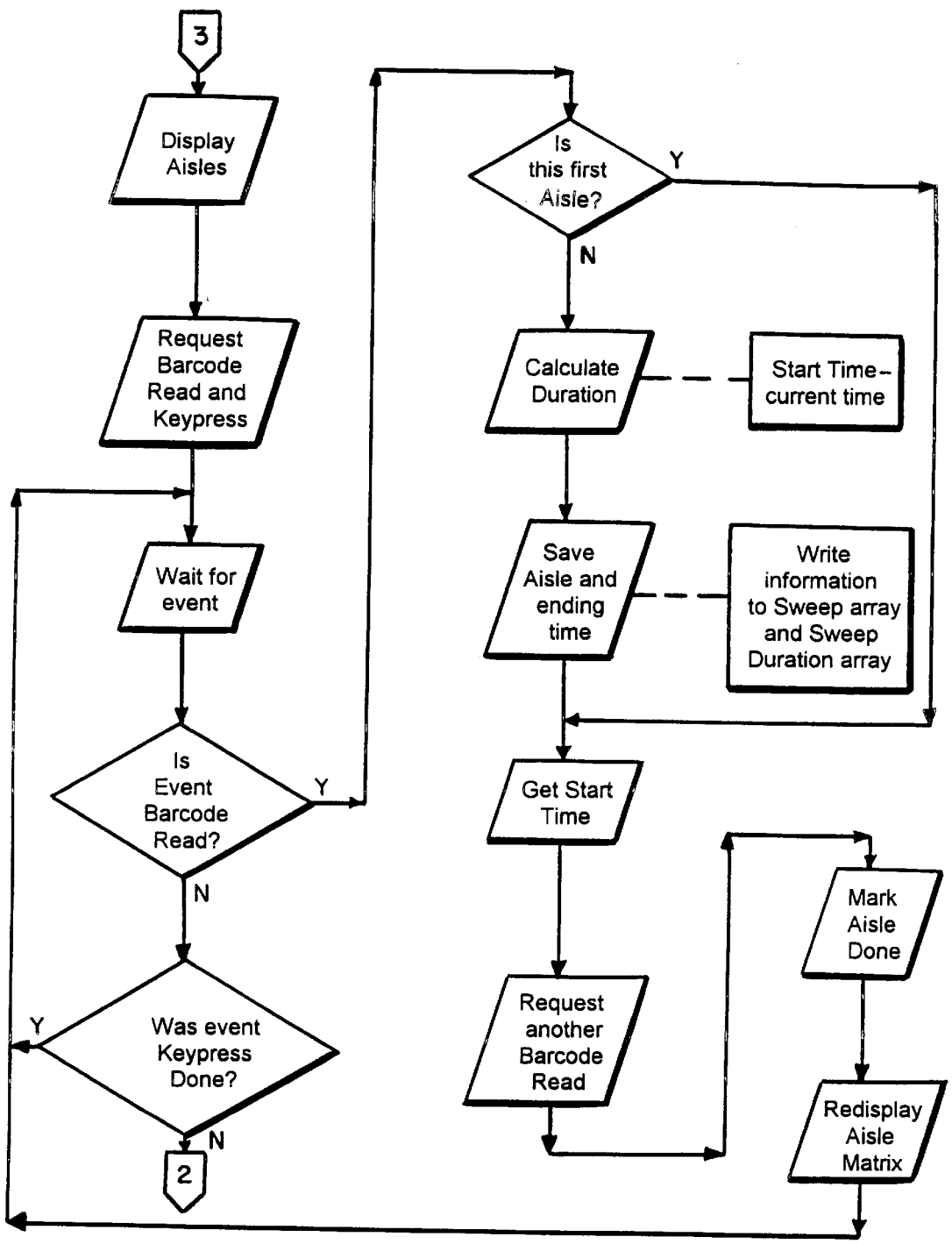
Figure 3D:
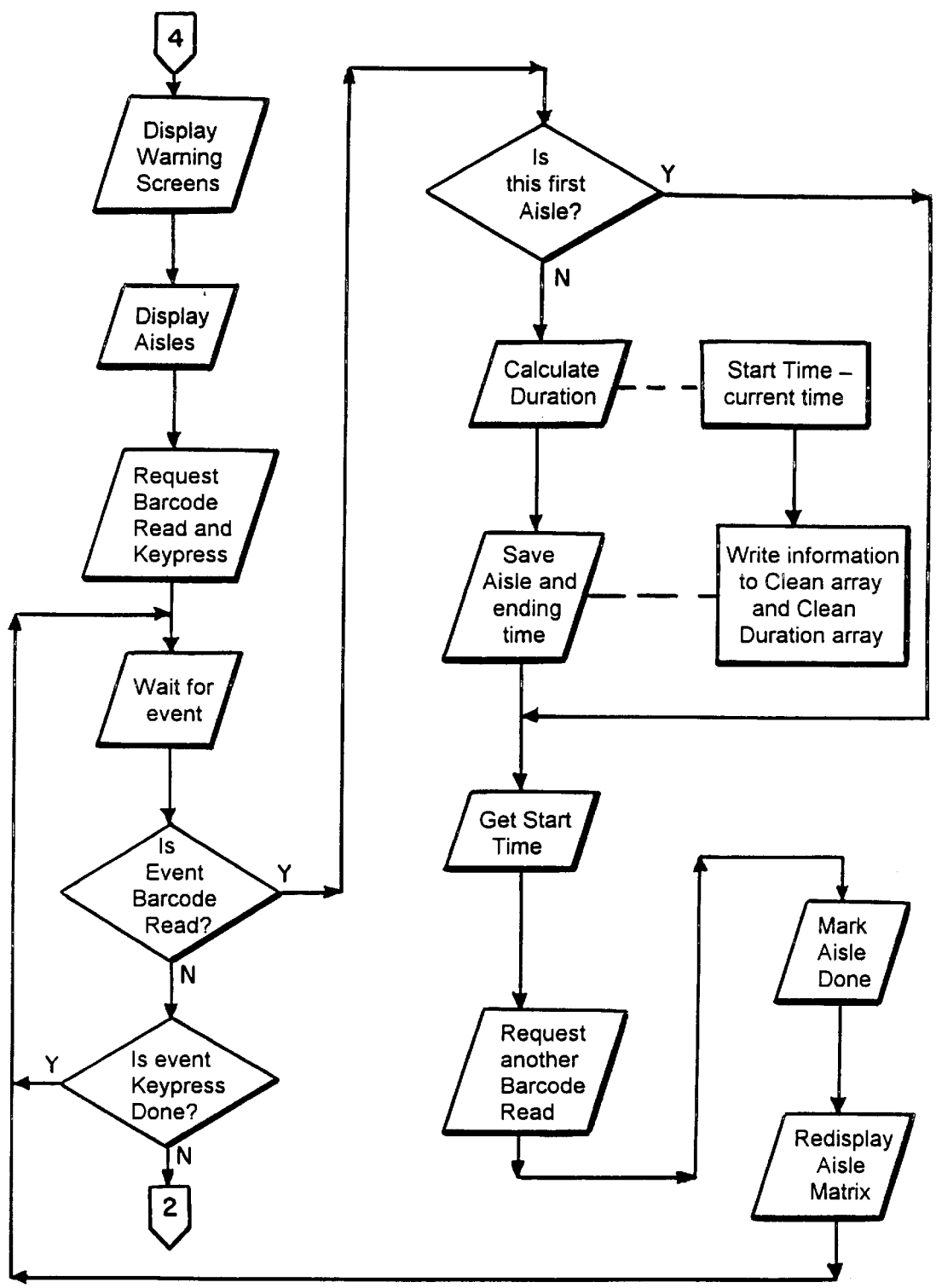
Figure 3E:
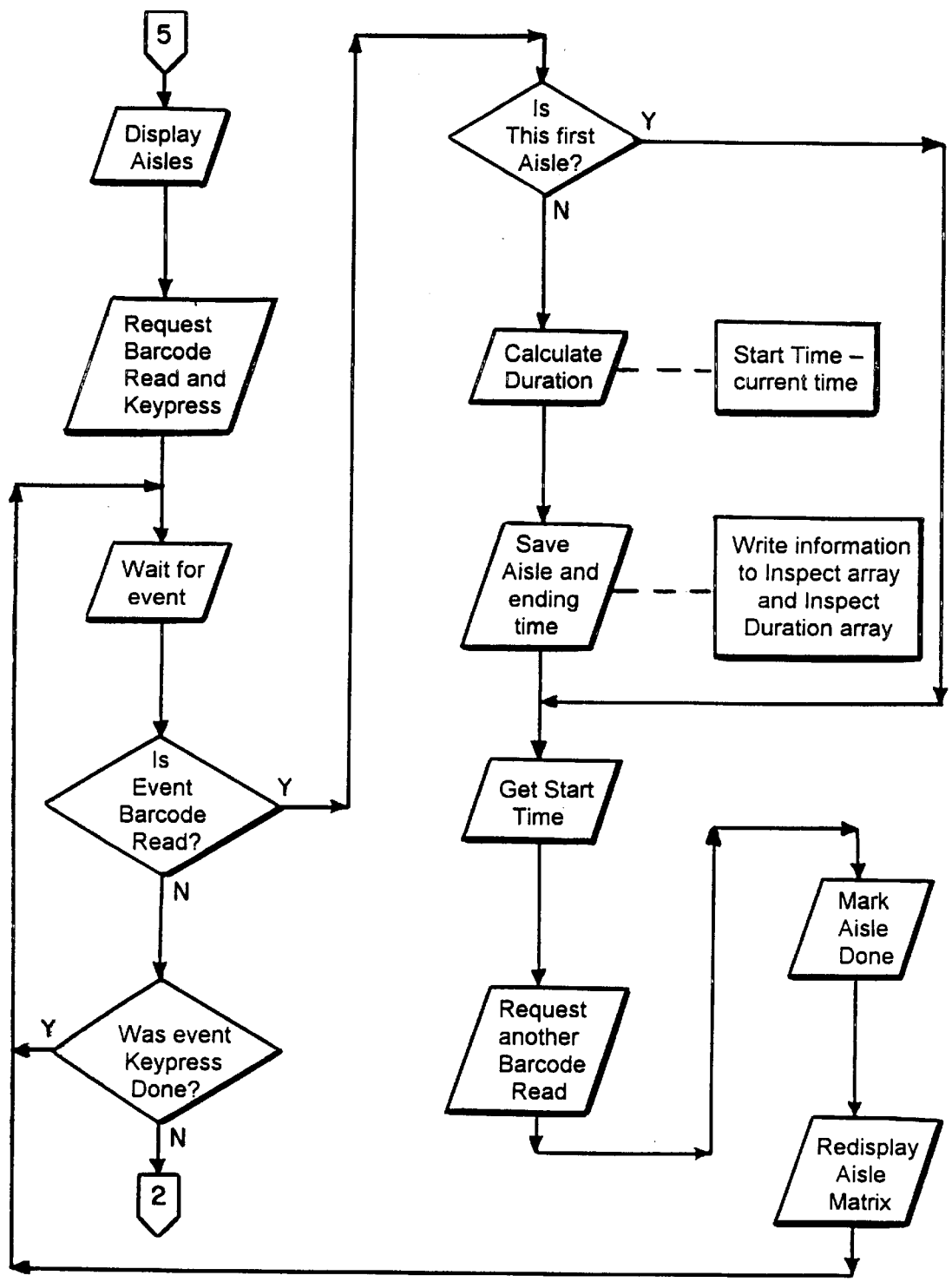
Figure 3F:
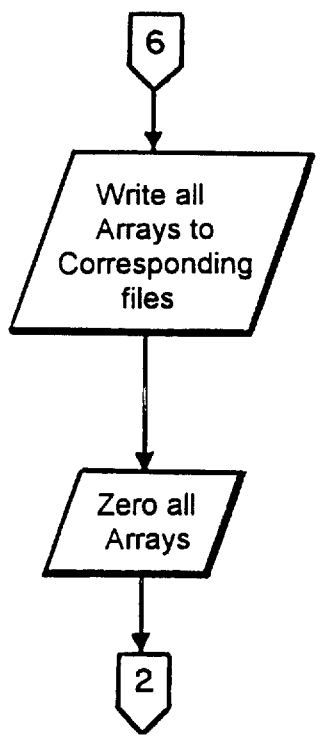
Figure 3G:
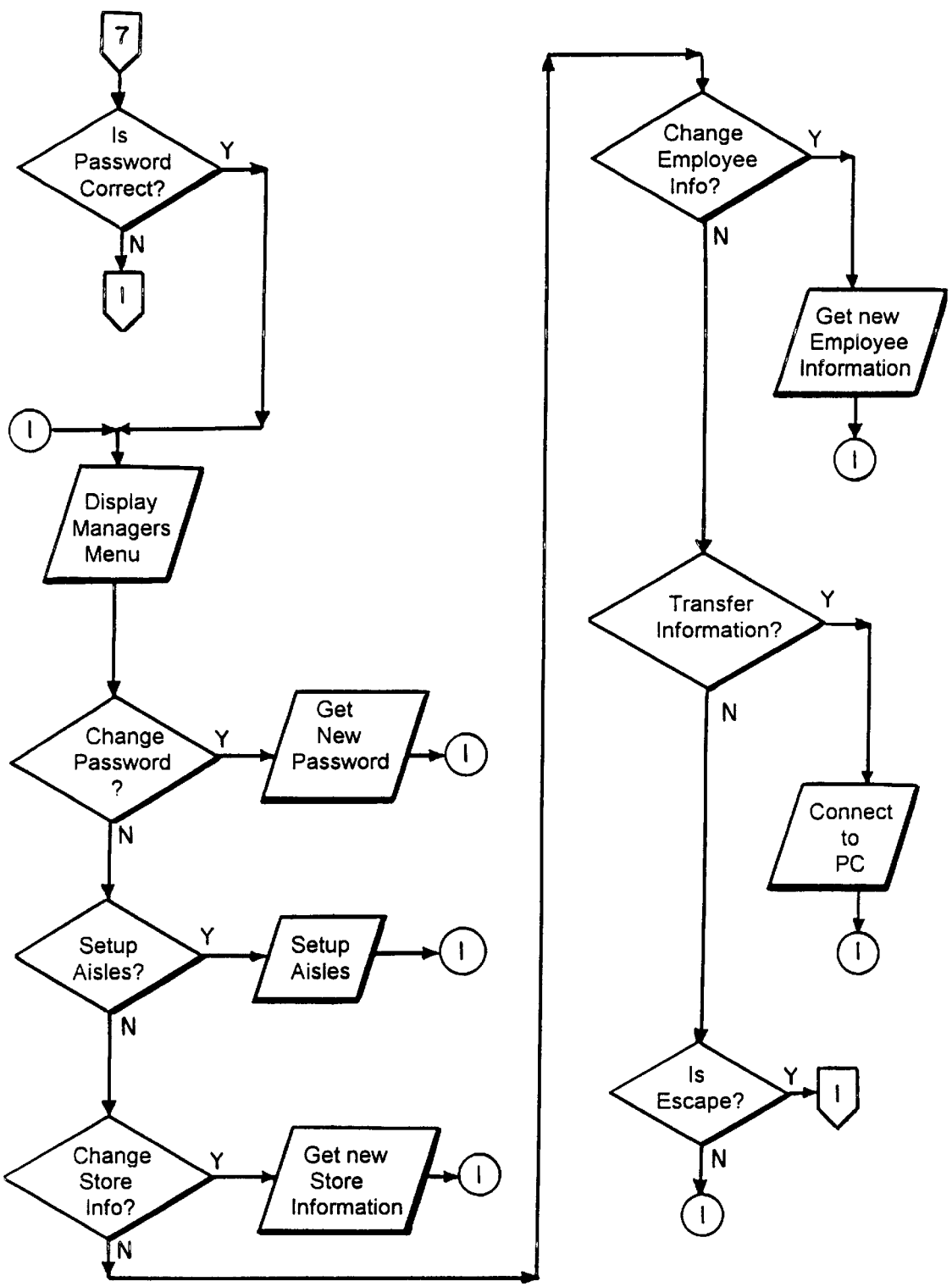

Such a commercially available device may be suitably modified for purposes of the present invention in a number of respects. For example, as mentioned above, the alphanumeric key layout may be supplemented or even replaced by an icon-driven input system as generally illustrated in FIG. 2. The device can be readily modified to incorporate such an icon input system such as by placement of an overlay printed with the selected icons on top of the alphanumeric display of the device. As shown in FIG. 2, icons could include symbols for sweeping (key 18), cleaning an isolated area such as cleaning a product spill (key 20), inspection of an area (key 22), "GO" (key 24) to progress through information provided by the device, and stop (key 26) of a given task or use of the device. Device 10 can be carried throughout the day by a worker, e.g., attached to the worker's belt or carrying pouch as indicated above. For such an icon system, the device can be programmed so that keys of the alphanumeric display underlying a particular icon are programmed to register when depressed the input shown on the overlying symbol.

Device 10 preferably conveys information to a worker via display 12 in as much of an icon format as possible. For example, when device 10 is turned on via key 14a an introductory message may appear on display 12 followed by a question asking the worker's name. That question may be accompanied by a picture of a worker name badge thereby instructing the worker that his name badge should be scanned to input his name via an appropriate bar code on the badge.

In preferred aspects of the invention, any written instructions displayed on screen 12 will be in the worker's native language and device 10 is capable of displaying instructions in multiple languages. The appropriate language for a particular worker can be programmed into the computer of device 10 and the device will run its display program once the worker's identity has been inputted such as at the start of a workshift, or whenever a worker turns on device 10 and is faced with an identifying question as discussed above. The appropriate language for a particular worker also could be information included on a bar code of the worker's name badge.

To illustrate use of the device, e.g. when a worker is faced with the clean up of a product spill, the worker would turn on device 10 and input the worker's identity e.g. by scanning of the worker's name badge that includes an appropriate bar code or by directly inputting the worker's name. After the worker's identity is inputted, device 10 could display on screen 12 the question "Activity" and the worker could input into the device the type of activity to be undertaken. Referring to device 10 in FIG. 2, the worker would press key 20 to indicate that a spill was being cleaned. Additionally, the worker could input the location of the spill and the type of spilled product. This could be accomplished e.g. by scanning a bar code affixed to the container of the spilled product as well as scanning a bar code located proximate to the spill. For example, in the case of a grocery store, one or more bar codes could be placed in each aisle and the worker would scan the closest bar code to the spill incident. Scanning of a bar code on the spilled product itself would facilitate accurate inventory controls and keeping of other records.

Also, rather than a bar code system, such information could be directly keyed into device, e.g., by use of an alphanumeric keypad associated with device 10 as generally depicted in FIG. 1. However, use of a bar code system and icon format as described will often be considered more convenient and reliable, particularly if the worker has limited English language skills.

Once the worker has inputted that a spill is being cleaned by pushing the appropriate key(s) on the device, device 10 preferably will provide the worker instructions and guidance for the cleaning job. For example, device 10 may depict on display 12 a set of gloves and protective eyewear to instruct the worker that such items should be donned before commencing the cleaning task. Compliance with safety instructions also could be confirmed by requiring the worker to respond to questions presented on display 12 indicating that the worker had donned a set of gloves or whatever other procedure had been communicated to the worker. Referring to FIG. 2, the worker is required to press the "GO" key 24 to advance the device to the next message once such a safety instruction has been provided on display 12 and thereby providing confirmation that the worker has complied with the safety instruction (or any other instruction that may be provided on display 12). In addition to such safety instructions, device 10 may further depict written or graphical instructions on display 12 regarding the task to be commenced. Again, the worker's compliance with such instructions can be confirmed through requiring the worker to depress key 24 in order to progress to the next message on display 12.

A worker could also employ device 10 to record cleaning of a store's floors such as by sweeping. By keeping a record of such work, reasonable maintenance of the store can be verified in the event the safety practices of the store are questioned. At the start of a cleaning job, the worker would press a key on device 10 to indicate that a particular floor area was being cleaned. Device 10 preferably also would have an input key to record the type of cleaning that was being performed, e.g. sweeping, by pressing key 18 (for sweeping). The floor area that was being cleaned also could be recorded by scanning a bar code located proximate to the floor area as discussed above with respect to cleaning spills. After the worker has finished cleaning a floor area, or is interrupted from cleaning the area such as when the worker is called upon to attend to another task at the store, the worker would input into device 10 that the cleaning was complete or at least interrupted. Such input could be directly keyed into the device, e.g., by use of an alphanumeric keypad associated with device 10. Alternatively, the input could be made by scanning a bar code located proximate to the floor area, or an icon-based input such as key 26 depicted in FIG. 2 and discussed above.

Again, once the worker inputs that a floor is to be cleaned by pressing key 18, device 10 preferably will provide the worker instructions and guidance for the job to be performed. Thus, e.g., device 10 may depict on display 12 protective eyewear to instruct the worker to wear such eyewear before commencing the job. Device 10 also may depict instructions on display 12 to guide the worker's performance of the task. As discussed above, preferably the instructions will be in an icon-format and/or the worker's native language and device 10 will be capable of displaying instructions in multiple languages with the appropriate language for a particular worker programmed into device 10 and selected as disclosed above. Also, once an activity of sweeping has been inputted, the device may be programmed to continually prompt the worker to input the cleaning of an additional store area until a designated cleaning cycle is completed Grocery stores and other retail centers are also often inspected on a regular basis during hours of operation to determine if any product spills have occurred, any floor areas require immediate cleaning, etc. Such inspections can be accurately recorded to verify completeness and regularity by use of the present invention. Thus, for example, at the start of a supermarket inspection, a worker would press key 22 on device 10 to indicate that floors and other areas of the store are to be inspected. As discussed above with respect to other tasks, device 10 may suitably provide the worker instructions for conducting the inspection, preferably in the worker's native language. The particular area that is being inspected could be directly inputted by the worker by striking appropriate key(s) on device 10, or more conveniently by scanning a bar code located proximate to the area being inspected, or by other means. After the worker has finished inspecting, or is interrupted from completing the inspection, the worker could input into device 10 that inspection was complete or at least interrupted. Such input could be directly keyed into the device, e.g., by use of an alphanumeric keypad associated with device 10. Alternatively, the input could be made by scanning a bar code located proximate to the last area being inspected, or an icon-based input such as key 26 depicted in FIG. 2 and discussed above. If the inspection was not complete, preferably the next time device 10 is activated by the worker, the device will indicate on display 12 the remaining store locations requiring inspection.

Additionally, device 10 can be programmed to provide a worker timely reminders of sweeping, inspection or other periodic task required to be performed during the course of a day. Thus, for example, if the floor areas of a supermarket or other retail center are scheduled to be swept and/or inspected every two hours during the supermarket's operation, device 10 could provide an audible sound and/or post a reminder message on display 12 if the worker was not performing the tasks as scheduled.

Other tasks conducted at a retail center would be carried out in accordance with the present invention in the same or similar manner as discussed above for cleaning, sweeping and inspection.

Periodically data recorded by device 10 will be typically uploaded to a further computer that may process the data and print reports of compiled information. That further computer can be located at the retail center itself or alternatively at a remote location where device 10 transmits data through a modem. Data reports can be formatted in a various manners as desired. For example, the data can be tabulated to show the period of time it takes particular workers to complete a given task and the costs for carrying out the task based on that worker's compensation. The data will also reflect if an area is being maintained as desired, e.g. if floors are being cleaned such as by sweeping, on a regular basis as intended.

The data will also aid worker evaluation, e.g. by tabulating the data to provide a report of the length of time and labor costs for a particular worker to complete a given task. Also, as indicated above, such a verified record of regular maintenance should be valuable to prevent or limit any liability that might arise from slip and fall-type incidents and the like.

Device 10 can be programmed to perform the above discussed functions in a number of ways. FIGS. 3A through 3G of the Drawings a flowchart of a suitable program to carry out the above discussed functions. Any of a number of programming languages may be employed. C is a preferred programming language to employ.

While use of the present invention in retail centers is generally, the maintenance analysis and instruction system of the invention also is suitably used in health-care facilities (e.g. hospitals, nursing homes, etc.), hospitality centers (e.g. hotels and other lodging facilities, etc.) and other buildings that require regular sweeping or other maintenance. In such locations the maintenance analysis and instruction system of the invention can be employed in the same manner as disclosed herein with respect to a retail center.

The foregoing description of the invention is merely illustrative thereof, and it is understood that variations and modifications can be effected without departing from the spirit or scope of the invention as set forth in the following claims.

What is claimed is:

1. A method of cleaning a product spill by a worker at a store comprising the steps of:

(a) providing a worker at a store with a portable programmable bar coded indicia reading, recording and display device, (b) the worker reading bar coded indicia with said device to input to the device the identity of the product which caused the spill in the store and which is to be cleaned, said device in response to said indicia displaying to the worker instructions regarding safety and disposal procedures and instructions to clean the particular spilled product, (c) the worker cleaning said spill following said procedures and instructions to clean the spill and dispose of same, and (d) the device recording the identity and location of the product spill and that said product spill has been cleaned by the worker.

2. The method of claim 1 wherein the device records 1) the identity of the spilled product, 2) the location of the spilled product within the store, and 3) the time period over which the cleaning is carried out by the worker.

3. The method of claim 1 wherein the device generates a written report of the recorded information.

4. The method of claim 1 wherein the store is a grocery store.

5. The method of claim 1 wherein the device provides the worker one or more safety procedures to be employed for cleaning the product spill.

6. The method of claim 5 wherein the device requests that the worker confirm compliance with the safety procedures.

7. The method according to claim 1 wherein the worker causes the device to read indicia on said product container which resulted in the spilled product.

8. The method according to claim 7 wherein the worker also causes the device to read indicia representing the approximate position of the spilled product in the store.

9. The method of claim 7 in which the indicia reading device reads bar coded indicia and wherein the bar coded indicia is on the said product container.

10. A method of cleaning a product spill by a worker at a health care facility or hospitality facility comprising the steps of:

(a) providing a worker at a health care facility or hospitality facility with a portable programmable bar coded indicia reading, recording and display device, (b) the worker reading bar coded indicia with said device to input to the device the identity of the product which caused the spill in the health care facility or hospitality facility and which is to be cleaned, said device in response to said indicia displaying to the worker instructions regarding safety and disposal procedures and instructions to clean the particular spilled product, (c) the worker cleaning said spill following said procedures and instructions to clean the spill and dispose of same, and (d) the device recording the identity and location of the product spill and that said product spill has been cleaned by the worker.

11. The method of claim 10 wherein the worker is at a health care facility.

12. The method of claim 10 wherein the worker is at a hospitality facility.

13. The method of claim 10 wherein the worker causes the device to read indicia indicia on the product which resulted in the spill.

14. The method of claim 10 wherein the device provides the worker one or more safety procedures to be employed for cleaning the product spill.

15. The method of claim 10 wherein the device generates a written report of the recorded information.

* * * * *